United States Patent
Hachisu

(10) Patent No.: US 12,462,985 B2
(45) Date of Patent: Nov. 4, 2025

(54) ELECTROLYTIC CAPACITOR AND SEATING PLATE

(71) Applicant: Panasonic Intellectual Property Management Co., Ltd., Osaka (JP)

(72) Inventor: Doyu Hachisu, Yamaguchi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 85 days.

(21) Appl. No.: 18/684,657

(22) PCT Filed: Aug. 26, 2022

(86) PCT No.: PCT/JP2022/032154
  § 371 (c)(1),
  (2) Date: Feb. 16, 2024

(87) PCT Pub. No.: WO2023/032830
  PCT Pub. Date: Mar. 9, 2023

(65) Prior Publication Data
  US 2025/0022663 A1   Jan. 16, 2025

(30) Foreign Application Priority Data
  Aug. 31, 2021 (JP) ................... 2021-141818

(51) Int. Cl.
  *H01G 9/012*  (2006.01)
  *H01G 9/08*  (2006.01)
(52) U.S. Cl.
  CPC ............... *H01G 9/012* (2013.01); *H01G 9/08* (2013.01)

(58) Field of Classification Search
  CPC ............. H01G 2/06; H01G 9/08; H01G 9/012
  See application file for complete search history.

(56) References Cited

U.S. PATENT DOCUMENTS

2012/0162860 A1* 6/2012 Taketani ............... H01G 9/012
                                                               29/832
2022/0238283 A1   7/2022 Kobayashi

FOREIGN PATENT DOCUMENTS

JP   2001-176755   6/2001
JP   2003-332172   11/2003
(Continued)

OTHER PUBLICATIONS

International Search Report of PCT application No. PCT/JP2022/032154 dated Nov. 15, 2022.

*Primary Examiner* — David M Sinclair
(74) *Attorney, Agent, or Firm* — Rimon P.C.

(57) ABSTRACT

A seating plate pair has a mounting surface having a pair of terminal storage grooves. Distal end portions of a pair of lead terminals are inserted into the pair of terminal storage grooves, respectively. The seating plate includes an auxiliary terminal on the mounting surface. The auxiliary terminal includes an auxiliary mounting portion, and a first embedded portion and a second embedded portion protruding respectively from both sides of the auxiliary mounting portion. The first embedded portion and the second embedded portion are embedded in the seating plate, and the auxiliary mounting portion is exposed on the mounting surface. On the mounting surface, the auxiliary terminal is disposed away from an adjacent terminal storage groove by ⅕ or more of a width of the adjacent terminal storage groove.

11 Claims, 8 Drawing Sheets

(56) References Cited

FOREIGN PATENT DOCUMENTS

| | | |
|---|---|---|
| JP | 2012-138414 | 7/2012 |
| JP | 2019-102604 | 6/2019 |
| JP | 2020-202363 | 12/2020 |

\* cited by examiner

ELECTROLYTIC CAPACITOR AND SEATING PLATE

TECHNICAL FIELD

The present disclosure relates to an electrolytic capacitor, and a seating plate. More specifically, the present disclosure relates to a surface mounting-type electrolytic capacitor and a seating plate included in the surface mounting-type electrolytic capacitor.

BACKGROUND

Unexamined Japanese Patent Publication No. 2012-138414 discloses a surface mounting-type capacitor including a capacitor body and a seating plate made of a resin molded article on which the capacitor body is placed.

A pair of insertion holes into which a pair of lead wires of the capacitor body are inserted, respectively, are provided in the seating plate. A pair of grooves, respectively, continuous with the pair of insertion holes are provided on a substrate mounting surface of the seating plate. A pair of terminal portions are formed by bending distal ends of the pair of lead wires, respectively, inserted into the pair of insertion holes, and the pair of terminal portions are housed in the pair of grooves, respectively. Two auxiliary terminal portions formed by bending one metal plate are provided on both sides of each groove. This capacitor is attached to a circuit board by soldering the pair of terminal portions and two auxiliary terminal portions provided on both sides of each groove to the circuit board.

SUMMARY

Technical Problem

In the capacitor (electrolytic capacitor) having the above configuration, two auxiliary terminal portions formed by bending one metal plate are disposed on both sides of the groove, and a piece connecting the auxiliary terminal portions on both sides is disposed above the groove. When the seating plate is thinned in order to realize downsizing of a component, there is a possibility that warpage is caused in the seating plate due to stress remaining in the bent portion of the piece connecting the auxiliary terminal portions on both sides. When the warpage is caused in the seating plate, solder joint between the auxiliary terminal portions and the circuit board becomes insufficient, and joint strength may decrease.

The present disclosure provides an electrolytic capacitor and a seating plate that can suppress a decrease in joint strength in a state of being mounted on a substrate.

Solution to Problem

An electrolytic capacitor according to an aspect of the present disclosure includes a capacitor body and a seating plate. The capacitor body includes a capacitor element, a container housing the capacitor element, and a pair of lead terminals protruding from a bottom surface of the container. The container has a bottomed cylindrical shape. The capacitor body is attached to an attachment surface of the seating plate. The seating plate has a pair of through-holes into which the pair of lead terminals are inserted, respectively. The seating plate has a mounting surface opposite to the attachment surface. The mounting surface has a pair of terminal storage grooves into which distal end portions of the pair of lead terminals are inserted, respectively. The pair of lead terminals are inserted into the pair of through-holes, respectively, to be bent along the mounting surface. The seating plate includes an auxiliary terminal disposed along each of the pair of terminal storage grooves on the mounting surface of the seating plate. The auxiliary terminal includes an auxiliary mounting portion, a first embedded portion, and a second embedded portion. The auxiliary mounting portion is disposed along a first axis along which an adjacent terminal storage groove among the pair of terminal storage grooves. The first embedded portion and the second embedded portion protrude respectively from both sides of the auxiliary mounting portion along a second axis intersecting the first axis. The first embedded portion and the second embedded portion are embedded in the seating plate, and the auxiliary mounting portion is exposed on the mounting surface of the seating plate. On the mounting surface of the seating plate, the auxiliary terminal is disposed away from the adjacent terminal storage groove among the pair of terminal storage grooves by $1/5$ or more of a width of the adjacent terminal storage groove.

A seating plate according to another aspect of the present disclosure is provided to an electrolytic capacitor. The electrolytic capacitor includes a capacitor body that includes a capacitor element, a container housing the capacitor element, and a pair of lead terminals protruding from a bottom surface of the container. The container has a bottomed cylindrical shape. The capacitor body is attached to an attachment surface of the seating plate The seating plate has a pair of through-holes into which the pair of lead terminals are inserted, respectively. The seating plate has a mounting surface opposite to the attachment surface. The mounting surface has a pair of terminal storage grooves into which distal end portions of the pair of lead terminals are inserted, respectively. The pair of lead terminals are inserted into the pair of through-holes, respectively, to be bent along the mounting surface. The seating plate includes an auxiliary terminal disposed along each of the pair of terminal storage grooves on the mounting surface of the seating plate. The auxiliary terminal includes an auxiliary mounting portion, a first embedded portion, and a second embedded portion. The auxiliary mounting portion is disposed along a first axis along which an adjacent terminal storage groove among the pair of terminal storage grooves. The first embedded portion and the second embedded portion protrude respectively from both sides of the auxiliary mounting portion along a second axis intersecting the first axis. The first embedded portion and the second embedded portion are embedded in the seating plate, and the auxiliary mounting portion is exposed on the mounting surface of the seating plate. On the mounting surface of the seating plate, the auxiliary terminal is disposed away from the adjacent terminal storage groove among the pair of terminal storage grooves by $1/5$ or more of a width of the adjacent terminal storage groove.

Advantageous Effect of Invention

According to the present disclosure, it is possible to suppress the decrease in joint strength in a state of being mounted on the substrate.

DESCRIPTION OF EMBODIMENT

Exemplary Embodiment (1) Overview

Figure 1:
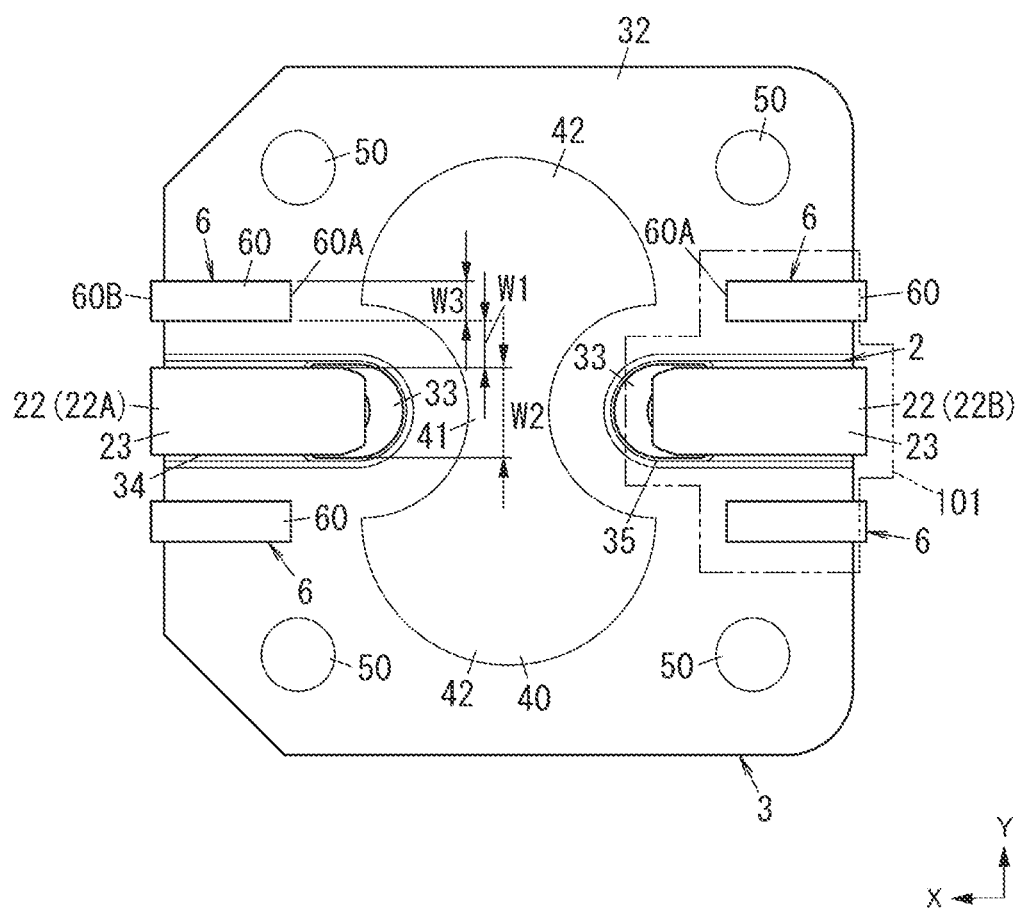
FIG. 1 is a bottom view illustrating an electrolytic capacitor according to an exemplary embodiment of the present disclosure.

Hereinafter, an electrolytic capacitor and a seating plate according to an exemplary embodiment will be described with reference to the drawings. Incidentally, the following exemplary embodiment is merely one of various exemplary embodiments of the present disclosure. The following exemplary embodiment can be variously changed in accordance with factors such as a design, as long as the object of the present disclosure can be achieved. In addition, the drawings described in the following exemplary embodiment are schematic representations, and ratios of sizes and thicknesses of components in the drawings does not necessarily need to reflect actual dimensional ratio.

As illustrated in FIGS. 1 to 4, electrolytic capacitor 1 of the present exemplary embodiment includes capacitor body 2 and seating plate 3. In other words, seating plate 3 is provided in electrolytic capacitor 1.

Capacitor body 2 includes container 21, which has a bottomed cylindrical shape, housing a capacitor element, and a pair of lead terminals 22 protruding from a bottom surface of container 21.

Figure 8:
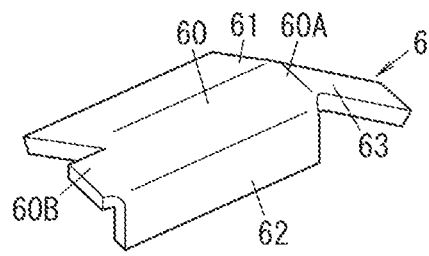
FIG. 8 is a perspective view illustrating an auxiliary terminal embedded in the seating plate.
Figure 8:
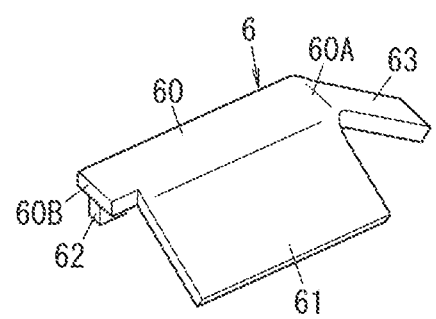

Capacitor body 2 is attached to attachment surface 31 of seating plate 3. A pair of through-holes 33 into which the pair of lead terminals 22 are inserted are provided in seating plate 3. Mounting surface 32 of seating plate 3 includes a pair of terminal storage grooves 34 into which distal end portions 23 of the pair of lead terminals 22 inserted into the pair of through-holes 33 are inserted to be bent along mounting surface 32. Mounting surface 32 of seating plate 3 is opposite to attachment surface 31. On mounting surface 32 of seating plate 3, auxiliary terminal 6 is provided along each of the pair of terminal storage grooves 34. Seating plate 3 includes auxiliary terminal 6 including auxiliary mounting portion 60 disposed along a first axis along which adjacent terminal storage groove 34 among the pair of terminal storage grooves 34, and first embedded portion 61 and second embedded portion 62 protruding respectively from both sides of auxiliary mounting portion 60 along a second axis intersecting the first axis (see FIGS. 8 to 10). First embedded portion 61 and second embedded portion 62 are embedded in seating plate 3, and auxiliary mounting portion 60 is exposed on mounting surface 32 of seating plate 3. On mounting surface 32 of seating plate 3, auxiliary terminal 6 is disposed away from adjacent terminal storage groove 34 among the pair of terminal storage grooves 34 by ⅕ or more of width W2 of terminal storage groove 34.

Here, a case where first embedded portion 61 and second embedded portion 62 are embedded in seating plate 3 is not limited to a case where entire first embedded portion 61 and entire second embedded portion 62 are embedded in seating plate 3. At least a part of first embedded portion 61 may be embedded in seating plate 3, and at least a part of second embedded portion 62 may be embedded in seating plate 3. In the following exemplary embodiment, first embedded portion 61 and second embedded portion 62 are embedded in seating plate 3 by, for example, molding, but may be embedded in seating plate 3 by press-fitting first embedded portion 61 and second embedded portion 62 into seating plate 3.

Figure 9:
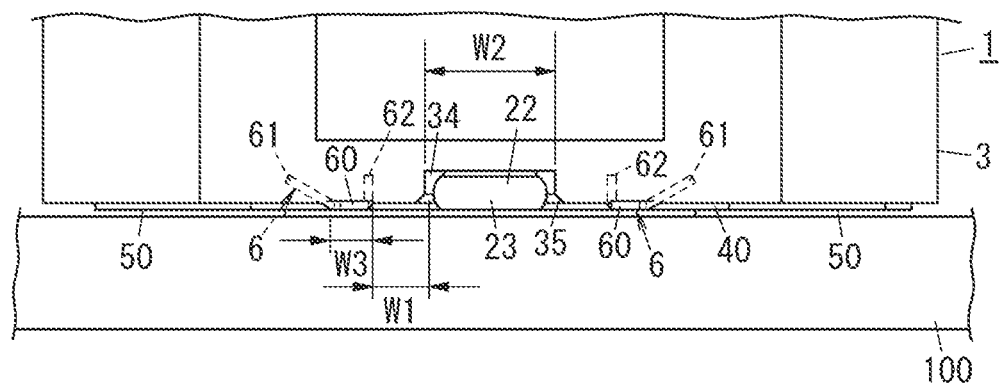
FIG. 9 is a diagram illustrating the electrolytic capacitor mounted on a substrate as viewed from a right side.
Figure 10:
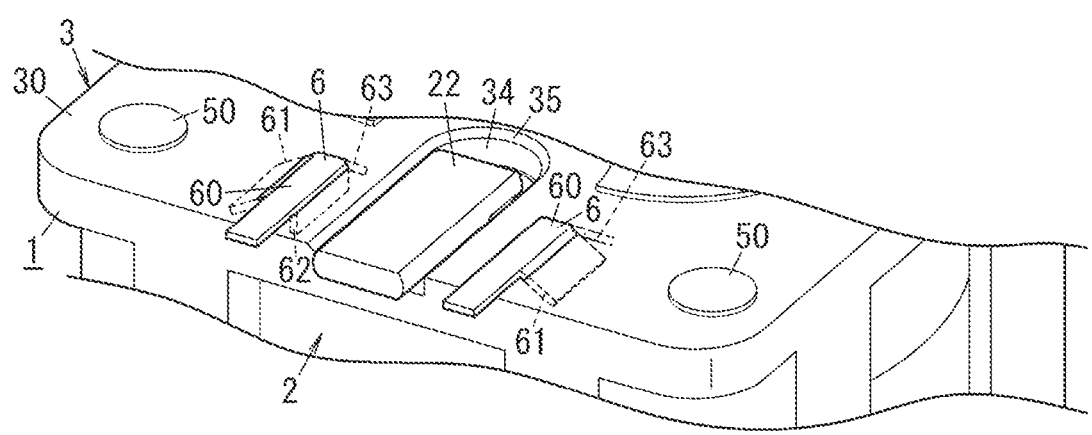
FIG. 10 is a perspective view illustrating a main part of the electrolytic capacitor as viewed from below.

Electrolytic capacitor 1 of the present exemplary embodiment is mounted by soldering auxiliary mounting portion 60 disposed on mounting surface 32 of seating plate 3 and lead terminal 22 to land 101 (see FIG. 1) of substrate 100 (see FIG. 9). In FIG. 1, land 101 formed on substrate 100 on which electrolytic capacitor 1 is mounted is indicated by a dashed double-dotted line. Note that, land 101 illustrated in FIG. 1 is an example, and a size and a shape of land 101 can be appropriately changed.

In the present exemplary embodiment, since auxiliary mounting portion 60 and lead terminal 22 are mounted on substrate 100, it is possible to increase joint strength as compared with a case where only lead terminal 22 is mounted on substrate 100. In addition, in the capacitor described in Unexamined Japanese Patent Publication No. 2012-138414, since one metal plate is bent to form two auxiliary terminal portions and a piece connecting two auxiliary terminal portions is integrally provided, the number of portions to be bent is increased. In contrast, in the present exemplary embodiment, since auxiliary terminal 6 includes auxiliary mounting portion 60 and first embedded portion 61 and second embedded portion 62, respectively, protruding from both sides of auxiliary mounting portion 60, the number of portions to be bent can be reduced. Thus, since it is possible to reduce warpage caused in seating plate 3 due to stress remaining in the bent portion, it is possible to suppress lifting of auxiliary mounting portion 60, and it is possible to suppress a decrease in the joint strength in a state of being mounted on substrate 100. In addition, since auxiliary terminal 6 is disposed to be away from adjacent terminal storage groove 34 among the pair of terminal storage grooves 34 by ⅕ or more of width W2 of terminal storage groove 34 on mounting surface 32, a sufficient amount of solder fillets are easily formed between distal end portion 23 of lead terminal 22 stored in terminal storage groove 34 and auxiliary mounting portion 60, and it is possible to increase the joint strength between electrolytic capacitor 1 and substrate 100.

(2) Details

Hereinafter, electrolytic capacitor 1 and seating plate 3 according to the present exemplary embodiment will be described in detail with reference to FIGS. 1 to 10. Note that, in the following description, in FIG. 1, the first axis along which terminal storage groove 34 is present is defined as an X-axis. Further, the second axis intersecting the first axis is defined as a Y-axis orthogonal to the X-axis, and an axis orthogonal to the X-axis and the Y-axis is defined as a Z-axis. Further, an X-axis direction is defined as a left-right direction, a Y-axis direction is defined as a front-rear direction (depth direction), a Z-axis direction is defined as an up-down direction. A positive orientation in the X-axis direction is defined as a left side, a positive orientation in the Y-axis direction is defined as a front side, and a positive orientation in the Z-axis direction is defined as an upper side. However, these directions are merely examples, and are not intended to limit directions of electrolytic capacitor 1 and seating plate 3 during use. In addition, arrows that point the directions are illustrated only for explanation in the drawings. The arrows are unsubstantial.

As a typical example, the present exemplary embodiment is described under an assumption that electrolytic capacitor 1 be an aluminum electrolytic capacitor.

Figure 2:
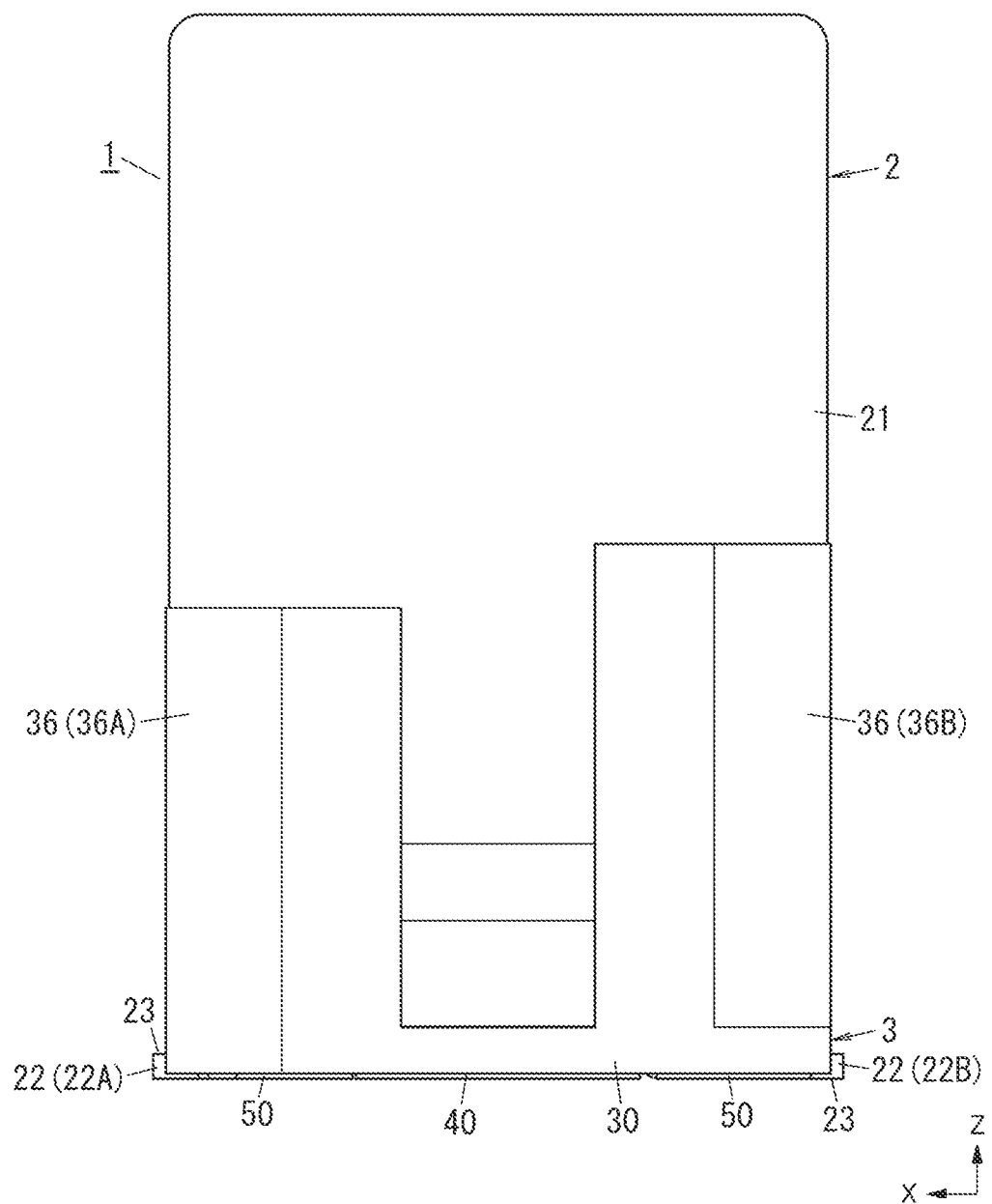
FIG. 2 is a front view illustrating the electrolytic capacitor.
Figure 3:
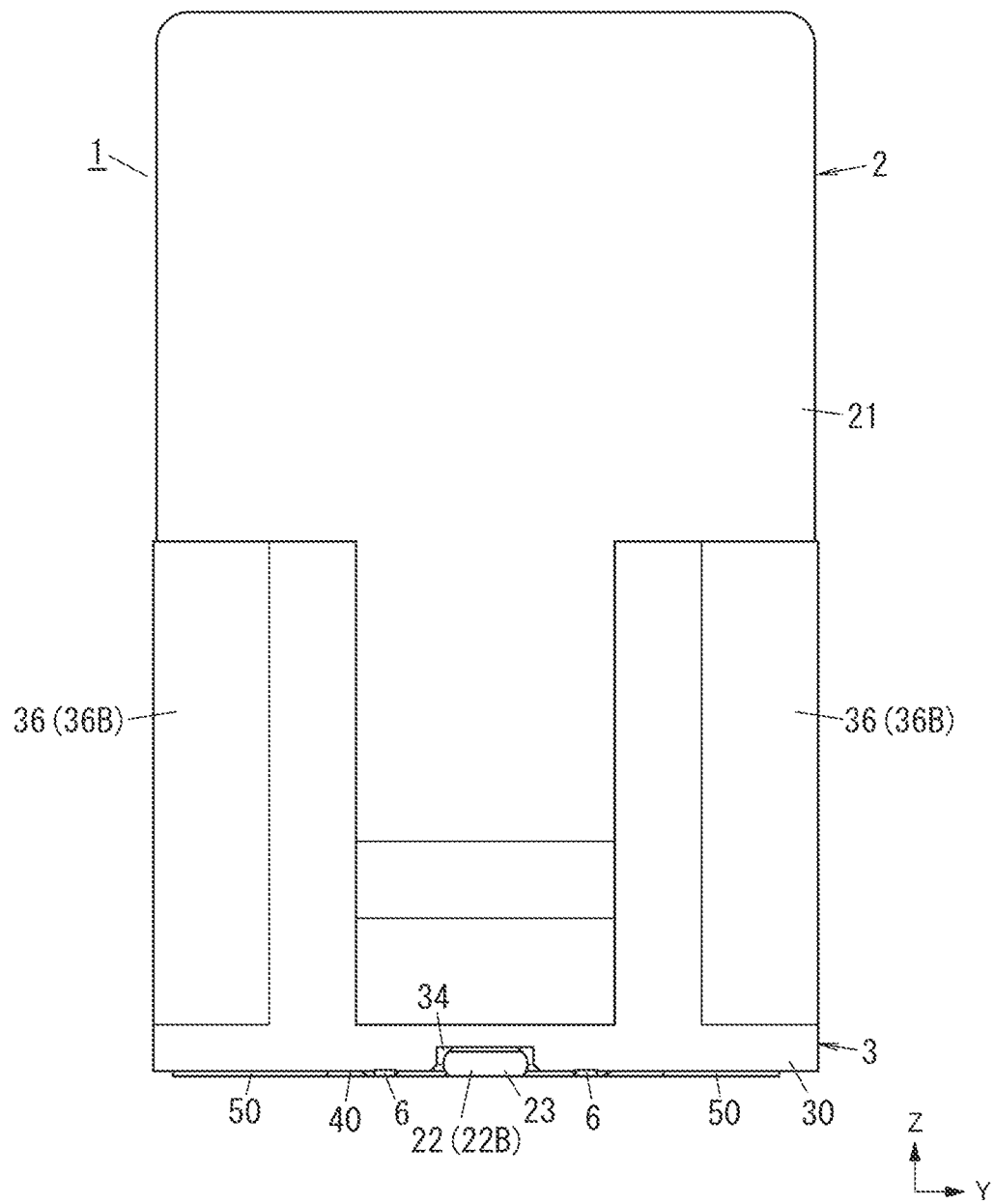
FIG. 3 is a right side view illustrating the electrolytic capacitor.
Figure 4:
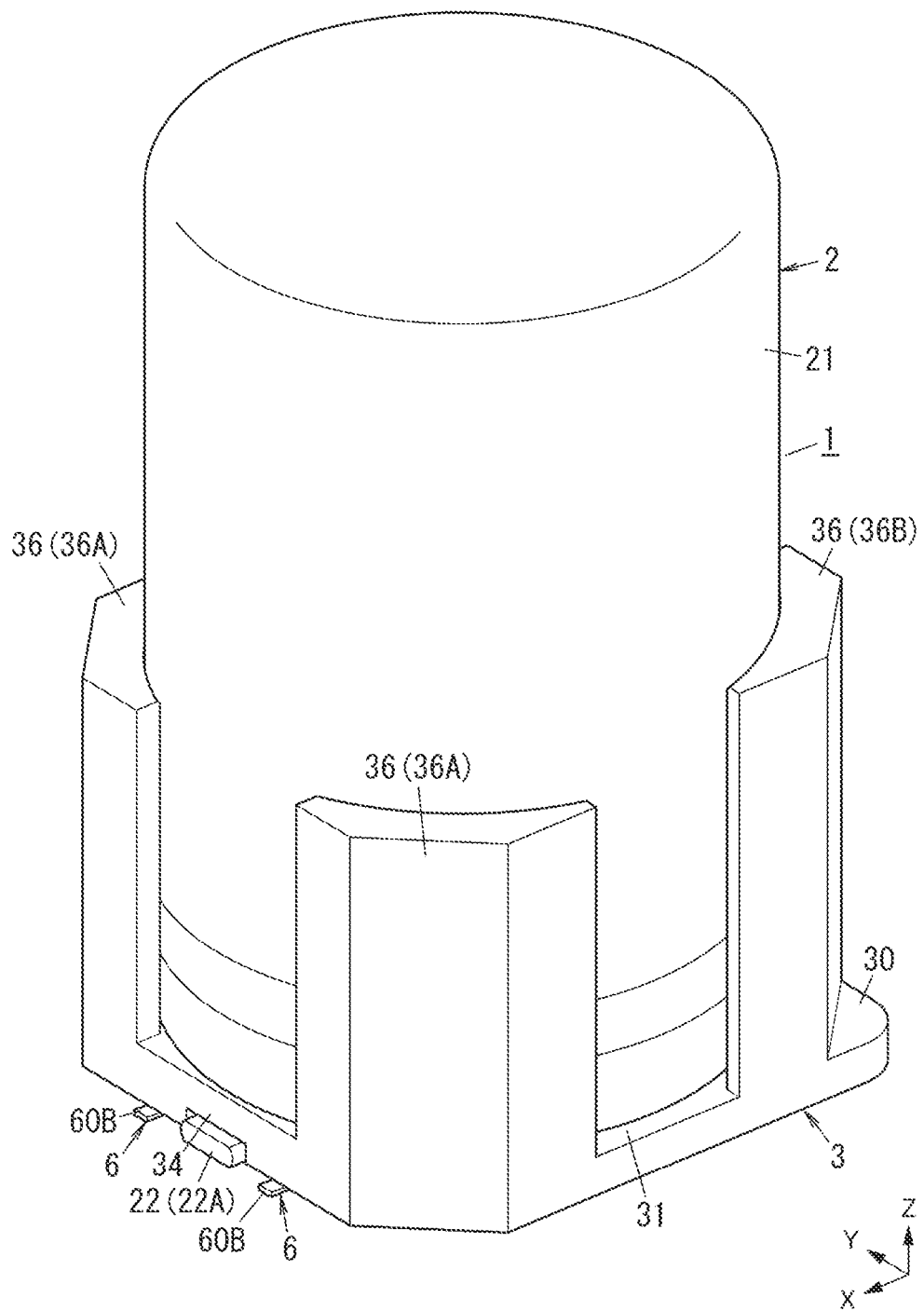
FIG. 4 is an external perspective view illustrating the electrolytic capacitor.

As illustrated in FIGS. 2 to 4, electrolytic capacitor 1 includes capacitor body 2. Capacitor body 2 includes container 21 and the pair of lead terminals 22.

Container 21 is formed in a hollow cylindrical shape. Container 21 includes a hollow cylindrical metal case having an open bottom, and a sealing member that closes the bottom of the metal case. A material of the metal case in container 21 is, for example, one or more materials selected from a group consisting of aluminum, stainless steel, copper, iron, and brass, and alloys thereof.

The capacitor element is housed inside container 21. The capacitor element includes an anode body, a cathode body, and a separator. The anode body includes a metal foil containing valve metal such as aluminum, tantalum, or niobium, and a dielectric layer formed on a surface of the metal foil. The cathode body includes a metal foil such as aluminum. The separator is disposed between the anode body and the cathode body and holds electrolyte. As the electrolyte, solid electrolyte such as conductive polymer, or an electrolytic solution can be used, for example. Otherwise, conductive polymer and an electrolytic solution may both be used. The anode body, the cathode body, and the separator are each formed into a sheet shape. The anode body, the cathode body, and the separator are winded into a roll shape in an overlapped state.

The pair of lead terminals 22 protrude downward from the sealing member of container 21. Here, among the pair of lead terminals 22, lead terminal 22 electrically connected to the anode body serves as lead terminal 22A on an anode side, and lead terminal 22 electrically connected to the cathode body serves as lead terminal 22B on a cathode side.

Seating plate 3 has electrical insulation properties. A material of seating plate 3 is, for example, a synthetic resin material such as polyphenylene sulfide (PPS) or polyphthalamide (PPA).

Figure 5:
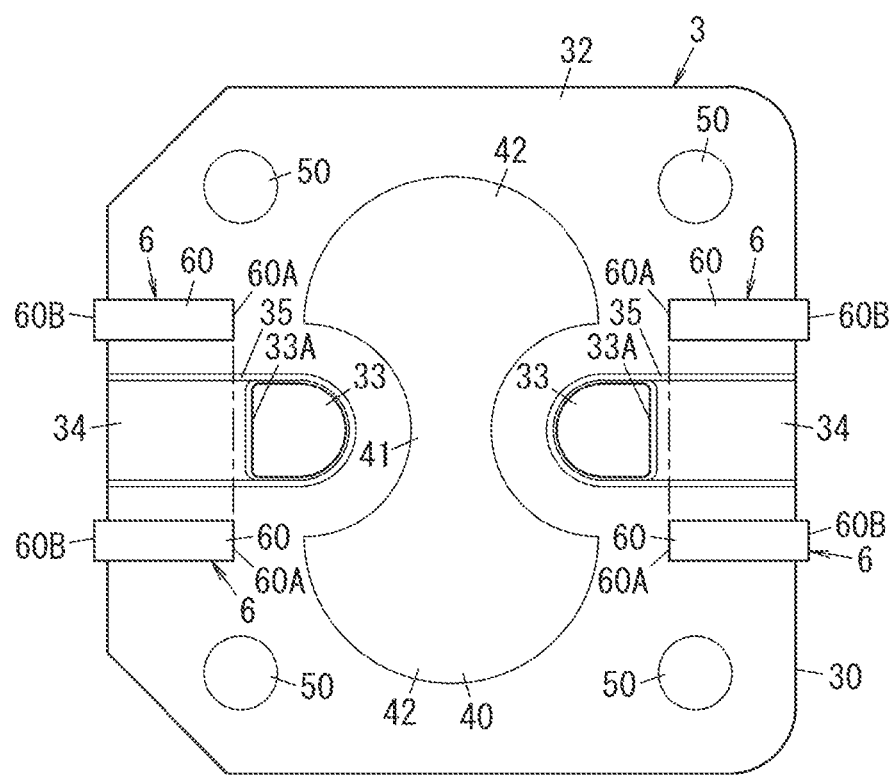
FIG. 5 is a bottom view illustrating a seating plate of the electrolytic capacitor.
Figure 6:
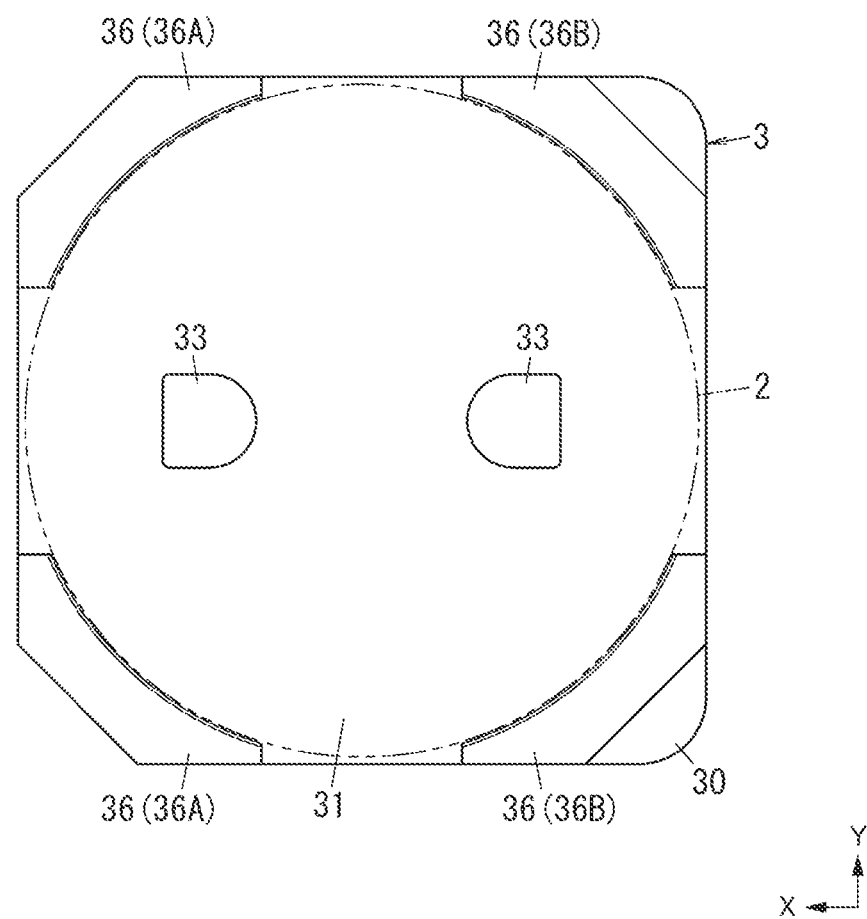
FIG. 6 is a top view illustrating the seating plate.
Figure 7:
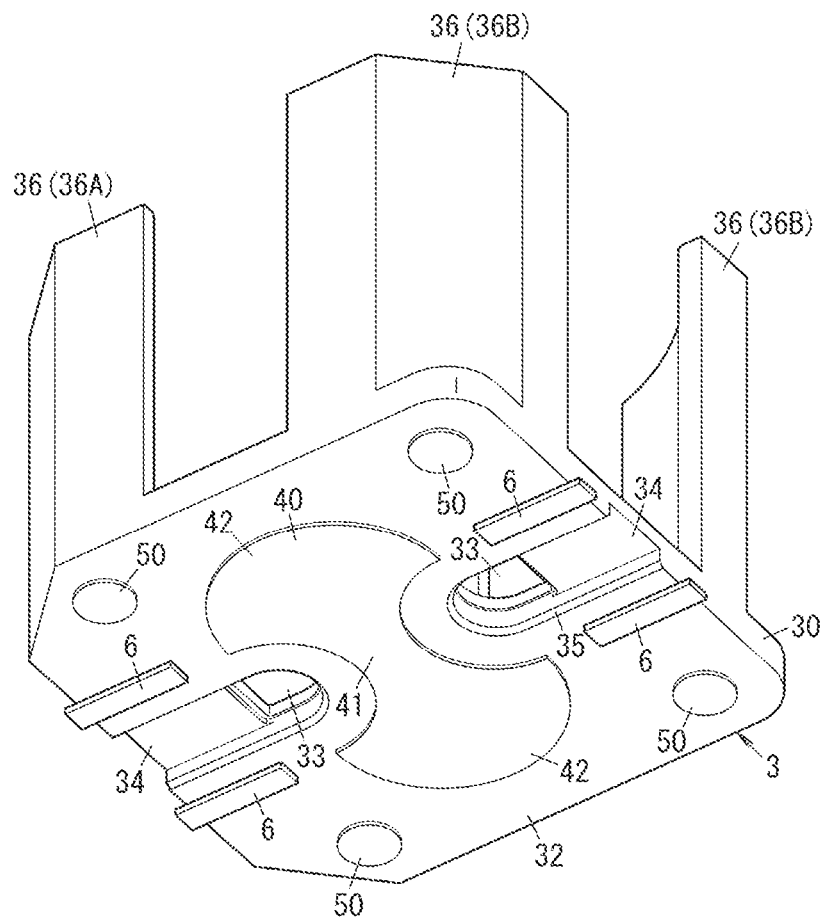
FIG. 7 is a perspective view illustrating the seating plate as viewed from below.

As illustrated in FIGS. 5 to 7, seating plate 3 includes base 30 in which capacitor body 2 is attached to attachment surface 31 (upper surface), and four columnar portions 36 protruding upward from attachment surface 31 of base 30.

Inner side surfaces of four columnar portions 36 are formed in curved surfaces along a peripheral surface of cylindrical capacitor body 2 having a cylindrical shape, and capacitor body 2 attached to attachment surface 31 is supported by four columnar portions 36. That is, columnar portions 36 that support capacitor body 2 are provided on attachment surface 31 of seating plate 3. Four columnar portions 36 are disposed at four corners of base 30 having a square shape, and four columnar portions 36 support capacitor body 2 from a periphery. Accordingly, even in a case where vibration is applied to substrate 100 on which electrolytic capacitor 1 is mounted, vibration of capacitor body 2 with respect to substrate 100 is suppressed, and a possibility that capacitor body 2 is peeled off from substrate 100 can be reduced.

Base 30 has a square shape, and distal end portions 23 of the pair of lead terminals 22 protrude from two opposing sides of base 30.

Here, a planar shape of base 30 is formed in a shape obtained by obliquely cutting two corners (two corners on a left side in FIG. 1) at both ends of a side from which lead terminal 22A on the anode side protrudes among the four corners, and a polarity of lead terminal 22 can be discriminated from the shape of base 30. In addition, four columnar portions 36 protrude upward from the four corners of attachment surface 31 of base 30. Among four columnar portions 36, two first columnar portions 36A positioned at both the ends of the side from which lead terminal 22A on the anode side protrudes are lower in height than other two second columnar portions 36B. Accordingly, the polarity of lead terminal 22 can also be discriminated from a difference in height between first columnar portion 36A and second columnar portion 36B.

The pair of through-holes 33 into which the pair of lead terminals 22 of capacitor body 2 are inserted are provided in base 30. The pair of through-holes 33 are provided side by side on the X-axis. On mounting surface 32 (lower surface) of base 30, terminal storage groove 34 that houses distal end portion 23 of lead terminal 22 is provided along the X-axis in continuation to each through-hole 33. That is, the pair of through-holes 33 corresponds to the pair of terminal storage grooves 34 on a one-to-one basis. Each of the pair of through-holes 33 is formed in a bottom surface of corresponding terminal storage groove 34, and penetrates base 30 in the up-down direction (thickness direction). A depth of each of the pair of terminal storage grooves 34 is smaller than a thickness of distal end portion 23 of lead terminal 22. In the present exemplary embodiment, for example, a thickness of base 30 is 0.8 mm, and the depth of each of the pair of terminal storage grooves 34 is 0.45 mm, but these dimensions are examples and can be appropriately changed.

At a lower end of an end face of each terminal storage groove 34 (that is, an end on an opening side of each terminal storage groove 34), chamfered portion 35 is formed by obliquely cutting the lower end of the end face. Chamfered portion 35 is provided, and thus, a section of each of the pair of terminal storage grooves 34 is formed in a sectional shape in which a width at the opening side is wider than a width at a bottom side. Accordingly, when electrolytic capacitor 1 is mounted on substrate 100, there is an advantage that a shape of the solder fillet formed in distal end portion 23 of lead terminal 22 is improved and joint strength is improved.

As illustrated in FIGS. 1 and 5, on mounting surface 32 of seating plate 3 (base 30), a pair of auxiliary terminals 6 are disposed respectively at both sides of each of the pair of terminal storage grooves 34. In the present exemplary embodiment, since the pair of terminal storage grooves 34 are provided on mounting surface 32 and two auxiliary terminals 6 are provided for each of the pair of terminal storage grooves 34, four auxiliary terminals 6 are provided on mounting surface 32 in total. In addition, the pair of auxiliary terminals 6 disposed respectively at both sides of each of the pair of terminal storage grooves 34 are separated from each other. That is, since there is no portion connecting the pair of auxiliary terminals 6 on both sides of each terminal storage groove 34, the number of portions to be bent can be reduced as compared with a case where the pair of auxiliary terminals 6 are integrally connected. Accordingly, since it is possible to reduce the warpage caused in seating plate 3 due to the stress remaining in the bent portion of auxiliary terminal 6, it is possible to suppress the lifting of auxiliary mounting portion 60, and it is possible to suppress the decrease in the joint strength between auxiliary mounting portion 60 and substrate 100.

As illustrated in FIGS. 1 and 8 to 10, auxiliary terminal 6 includes auxiliary mounting portion 60 having a rectangular shape disposed along the X-axis (first axis), and first embedded portion 61 and second embedded portion 62, respectively, protruding from both sides of auxiliary mounting portion 60 on the Y-axis (second axis).

A planar shape of auxiliary mounting portion 60 is a rectangular shape in which sides along the X-axis are long sides. First embedded portion 61 protrudes from a long side farther from terminal storage groove 34, among two long sides of auxiliary mounting portion 60, and second embedded portion 62 protrudes from a long side closer to terminal storage groove 34. First embedded portion 61 protrudes in an orientation (obliquely upward) obliquely intersecting a perpendicular line of auxiliary mounting portion 60, and second embedded portion 62 protrudes in an orientation (upward) orthogonal to auxiliary mounting portion 60. Note that, the term "orthogonal" is not limited to a case where two surfaces intersect at an angle of 90 degrees, and an intersection angle of two surfaces may be deviated by about several degrees from 90 degrees.

Here, in the first axis (X-axis), first end 60A of auxiliary mounting portion 60 closer to adjacent through-hole 33 among the pair of through-holes 33 is disposed at a position closer to an outer edge of seating plate 3 than adjacent through-hole 33. That is, in FIG. 5, first ends 60A (left end portions) of two auxiliary mounting portions 60 disposed on a right side of seating plate 3 are disposed at positions closer to a right side edge (outer edge) of seating plate 3 than edge portion 33A of through-hole 33 on a right side. In addition, in FIG. 5, first ends 60A (right end portions) of two auxiliary mounting portions 60 disposed on a left side of seating plate 3 are disposed at positions closer to a left side edge (outer edge) of seating plate 3 than edge portion 33A of through-hole 33 on a left side. Accordingly, auxiliary mounting portion 60 can be disposed near distal end portion 23 of lead terminal 22 stored in terminal storage groove 34. Accordingly, there is an advantage that auxiliary mounting portion 60 can be reliably soldered to land 101 of substrate 100 to which distal end portion 23 of lead terminal 22 is soldered and the joint strength is improved.

Further, second end 60B of auxiliary mounting portion 60 reaches an end face of seating plate 3. Second end 60B of auxiliary mounting portion 60 is an end portion farther from adjacent through-hole 33 among the pair of through-holes 33 in the first axis (X-axis). Here, through-hole 33 adjacent to auxiliary mounting portion 60 is through-hole 33 provided in the bottom surface of terminal storage groove 34 to which auxiliary mounting portion 60 is adjacent. A case where second end 60B of auxiliary mounting portion 60 reaches the end face of seating plate 3 means that second end 60B is at the same position as the end face of seating plate 3 on the first axis (X-axis), or second end 60B further protrudes outward from the end face of seating plate 3. Since second end 60B of auxiliary mounting portion 60 is provided up to a position where the second end reaches the end face of seating plate 3, there is an advantage that an area of auxiliary mounting portion 60 joined to land 101 of substrate 100 by solder can be increased and the joint strength is improved. Note that, in the present exemplary embodiment, second end 60B of auxiliary mounting portion 60 protrudes outward from the end face of seating plate 3, but auxiliary terminal 6 may be disposed at a position where a distal end face of second end 60B is flush with the end face of seating plate 3.

Further, third embedded portion 63 protruding from first end 60A closer to adjacent through-hole 33 among the pair of through-holes 33 on the first axis (X-axis) is provided in auxiliary mounting portion 60. Third embedded portion 63 is embedded in seating plate 3. Third embedded portion 63 protrudes in the orientation (obliquely upward) obliquely intersecting the perpendicular line of auxiliary mounting portion 60. Entire third embedded portion 63 is not necessarily embedded in seating plate 3, and at least a part of third embedded portion 63 may be embedded in seating plate 3. Third embedded portion 63 is embedded in seating plate 3 by, for example, molding, but may be embedded in seating plate 3 by press-fitting third embedded portion 63 into seating plate 3. Since first to third embedded portions 61 to 63 are embedded in seating plate 3, it is possible to suppress the lifting of auxiliary mounting portion 60, and it is possible to improve the joint strength of auxiliary mounting portion 60 to substrate 100.

Here, since third embedded portion 63 is not exposed from terminal storage groove 34 in a state where third embedded portion 63 is embedded in seating plate 3, a possibility that third embedded portion 63 interferes with distal end portion 23 of lead terminal 22 inserted into terminal storage groove 34 can be reduced, and a work of attaching capacitor body 2 to seating plate 3 can be smoothly performed.

Further, in the present exemplary embodiment, first embedded portion 61, second embedded portion 62, and third embedded portion 63 protrude from three sides of auxiliary mounting portion 60 in directions different from each other, and first embedded portion 61, second embedded portion 62, and third embedded portion 63 are provided apart from each other. Accordingly, there is an advantage that auxiliary terminal 6 is hardly detached from seating plate 3, and there is an advantage that vibration resistance performance is improved since electrolytic capacitor 1 is firmly fixed to substrate 100 in a state where electrolytic capacitor 1 is mounted on substrate 100.

Here, on mounting surface 32 of seating plate 3, auxiliary terminal 6 is preferably disposed away from adjacent terminal storage groove 34 among the pair of terminal storage grooves 34 by ¾ or more of width W3 of auxiliary mounting portion 60. In other words, auxiliary terminal 6 is preferably disposed on mounting surface 32 such that distance W1 from auxiliary mounting portion 60 of auxiliary terminal 6 to the end face of terminal storage groove 34 is ¾ or more of width W3 of auxiliary mounting portion 60. When the distance from auxiliary mounting portion 60 to the end face of terminal storage groove 34 is shortened, and when electrolytic capacitor 1 is mounted on substrate 100, solder flows through auxiliary mounting portion 60, and thus, a sufficient amount of solder fillets may not be formed in distal end portion 23 of lead terminal 22. In the present exemplary embodiment, since auxiliary terminal 6 is disposed away from adjacent terminal storage groove 34 by ¾ or more of width W3 of auxiliary mounting portion 60, there is an advantage that a sufficient amount of solder fillets are easily formed in lead terminal 22 and auxiliary mounting portion 60, and the joint strength is improved.

Note that, in the present exemplary embodiment, auxiliary terminal 6 is disposed away from adjacent terminal storage groove 34 among the pair of terminal storage grooves 34 by ⅕ or more of width W2 of terminal storage groove 34, but is preferably disposed away by ⅓ or more of width W2 of terminal storage groove 34. In a case where width W3 of auxiliary mounting portion 60 of auxiliary terminal 6 is large, even though auxiliary terminal 6 is disposed away from terminal storage groove 34 by ⅕ or more of width W2, distance W1 from auxiliary mounting portion 60 to terminal storage groove 34 may not be set to ¾ or more of width W3 of auxiliary mounting portion 60. In such a case, auxiliary terminal 6 may be disposed away from terminal storage groove 34 by ⅓ or more of width W2 of terminal storage groove 34, and a sufficient amount of solder fillets can be formed in lead terminal 22 and auxiliary mounting portion 60 by setting distance W1 from auxiliary mounting portion 60 to terminal storage groove 34 to be ¾ or more of width W3 of auxiliary mounting portion 60.

Further, on mounting surface 32 of seating plate 3, first projection 40 is provided at a portion between the pair of through-holes 33. A projecting amount of first projection 40 is a dimension smaller than a distance from mounting surface 32 to distal end portion 23 of lead terminal 22, and is, for example, 0.1 mm in the present exemplary embodiment.

First projection 40 extends along the Y-axis and includes narrow portion 41 positioned between the pair of through-holes 33 and wide portions 42 disposed respectively at both sides with respect to narrow portion 41 in the Y-axis. A width of wide portion 42 along the X-axis is larger than a width of narrow portion 41 along the X-axis. More specifically, first projection 40 is formed in a planar shape in which a semicircular portion is coupled to two opposing sides of a rectangle and the other two opposing sides of the rectangle are scraped by two circles with the pair of through-holes 33 as centers. Accordingly, as compared with a case where first projection 40 is formed in a rectangular shape, an area can be increased by wide portions 42, and the warpage of seating plate 3 can be reduced by increasing rigidity of seating plate 3.

Further, on mounting surface 32 of seating plate 3, second projections 50 having a circular shape are provided at portions corresponding to four columnar portions 36. Here, a projecting amount of second projection 50 is substantially the same as the projecting amount of first projection 40. Since second projection 50 is provided at a position opposite to a position of columnar portion 36 in attachment surface 31, a weight of columnar portion 36 can be supported by second projection 50 coming into contact with substrate 100, and deformation of base 30 can be suppressed.

Capacitor body 2 and seating plate 3 have the above-described structure, and electrolytic capacitor 1 is realized by holding capacitor body 2 by seating plate 3. More specifically, capacitor body 2 is disposed on attachment surface 31 of seating plate 3 in a state where the pair of lead terminals 22 are inserted into the pair of through-holes 33. In the pair of lead terminals 22, distal end portions 23 protruding downward from the pair of through-holes 33 are bent in orientations opposite to each other, and thus, distal end portions 23 of the pair of lead terminals 22 are disposed in the pair of terminal storage grooves 34, respectively. Here, capacitor body 2 is attached to seating plate 3 by sandwiching base 30 between distal end portions 23 of the pair of lead terminals 22 and the bottom surface of container 21. In a state where capacitor body 2 is attached to seating plate 3, since distal end portions 23 of the pair of lead terminals 22 are, respectively, inserted into the pair of terminal storage grooves 34 of base 30, rotation of container 21 with respect to base 30 is restricted.

Then, electrolytic capacitor 1 is mounted on substrate 100 by soldering distal end portions 23 of the pair of lead terminals 22 disposed on mounting surface 32 and the pair of auxiliary terminals 6 disposed on both sides of each of distal end portions 23 to land 101 of substrate 100.

(3) Modifications

The above exemplary embodiment is merely one of various exemplary embodiments of the present disclosure. The above exemplary embodiment can be variously changed in accordance with design and the like as long as the object of the present disclosure can be achieved.

Hereinafter, modifications of the above exemplary embodiment will be recited. The modifications to be described below can be applied in appropriate combination.

Electrolytic capacitor 1 may include the pair of lead terminals 22, and may include three or more lead terminals 22.

A shape of lead terminal 22 is not limited to have a shape bent for surface mounting. The shape of lead terminal 22 may have a linear shape. That is, electrolytic capacitor 1 may be a so-called radial lead type electrolytic capacitor.

In the present exemplary embodiment, auxiliary terminals 6 are disposed on both sides of each terminal storage groove 34 on the second axis, but auxiliary terminals 6 may be disposed only on one side on the second axis.

The shape of auxiliary terminal 6 is not limited to the shape described in the exemplary embodiment. Although auxiliary terminal 6 includes third embedded portion 63, third embedded portion 63 is not essential and can be omitted as appropriate.

Although the lower end of the end face of terminal storage groove 34 is chamfered, the sectional shape of terminal storage groove 34 is not limited to the shape illustrated in the exemplary embodiment. Terminal storage groove 34 may be formed in a sectional shape in which the opening side of terminal storage groove 34 expands by providing a step portion on the end face of the terminal storage groove.

Although container 21 of capacitor body 2 has the cylindrical shape, a shape of container 21 can be appropriately changed, and may have a prismatic shape or the like.

CONCLUSION

As described above, electrolytic capacitor (1) of a first aspect includes capacitor body (2) and seating plate (3). Capacitor body (2) includes a capacitor element, container (21) housing the capacitor element, and a pair of lead terminals (22) protruding from a bottom surface of container (21). Container (21) has a bottomed cylindrical shape. Capacitor body (2) is attached to attachment surface (31) of seating plate (3). Seating plate (3) has a pair of through-holes (33) into which the pair of lead terminals (22) are inserted, respectively. Seating plate (3) has mounting surface (32) opposite to attachment surface (31), mounting surface (32) having a pair of terminal storage grooves (34). Distal end portions (23) of the pair of lead terminals (22) that are inserted into the pair of through-holes (33), respectively, to be bent along the mounting surface are inserted into the pair of terminal storage grooves (34), respectively. Seating plate (3) includes auxiliary terminal (6) disposed along each of the pair of terminal storage grooves (34) on mounting surface (32) of seating plate (3). Auxiliary terminal (6) includes auxiliary mounting portion (60), first embedded portion (61), and second embedded portion (62). Auxiliary mounting portion (60) is disposed along a first axis along which adjacent terminal storage groove (34) among the pair of terminal storage grooves (34). First embedded portion (61) and second embedded portion (62) protrude respectively from both sides of auxiliary mounting portion (60) along a second axis intersecting the first axis. First embedded portion (61) and second embedded portion (62) are embedded in seating plate (3), and auxiliary mounting portion (60) is exposed on mounting surface (32) of seating plate (3). On mounting surface (32) of seating plate (3), auxiliary terminal (6) is disposed away from adjacent terminal storage groove

(34) among the pair of terminal storage grooves (34) by ⅕ or more of a width of adjacent terminal storage groove (34).

In the capacitor described in Unexamined Japanese Patent Publication No. 2012-138414, since one metal plate is bent to form two auxiliary terminal portions and a piece connecting two auxiliary terminal portions is integrally provided, the number of portions to be bent is increased. In contrast, according to electrolytic capacitor (1) of the first aspect, since auxiliary terminal (6) includes auxiliary mounting portion (60), and first embedded portion (61) and second embedded portion (62) protruding respectively from both sides of auxiliary mounting portion (60), the number of portions to be bent can be reduced. Thus, since the warpage caused in seating plate (3) due to the stress remaining in the bent portion can be reduced, the lifting of auxiliary mounting portion (60) can be suppressed, and the decrease in the joint strength in the state of being mounted on substrate (100) can be suppressed. In addition, since auxiliary terminal (6) is disposed to be away from adjacent terminal storage groove (34) by ⅕ or more of a width of terminal storage groove (34) on mounting surface (32), a sufficient amount of solder fillets are easily formed between distal end portion (23) of lead terminal (22) stored in terminal storage groove (34) and auxiliary mounting portion (60). Accordingly, it is possible to increase the joint strength between electrolytic capacitor (1) and substrate (100), and it is possible to suppress the decrease in the joint strength in a state of being mounted on substrate (100).

In the first aspect, in electrolytic capacitor (1) of a second aspect, first end (60A) of auxiliary mounting portion (60) is closer to an outer edge of seating plate (3) than adjacent through-hole (33). First end (60A) of auxiliary mounting portion (60) is an end portion at a side closer to adjacent through-hole (33) among the pair of through-holes (33) in a direction along the first axis.

According to this aspect, since first end (60A) of auxiliary mounting portion (60) is positioned closer to the outer edge of seating plate (3) than adjacent through-hole (33), auxiliary mounting portion (60) can be disposed near distal end portion (23) of lead terminal (22) soldered to substrate (100), and auxiliary mounting portion (60) can be reliably soldered to substrate (100).

In the first or second aspect, in electrolytic capacitor (1) of a third aspect, a section of each of the pair of terminal storage grooves (34) has a sectional shape in which a width at an opening side is wider than a width at a bottom side.

According to this aspect, the shape of the solder fillet formed in distal end portion (23) of lead terminal (22) stored in terminal storage groove (34) is improved, and the joint strength can be improved.

In any one of the first to third aspects, in electrolytic capacitor (1) of a fourth aspect, seating plate (3) includes a pair of auxiliary terminals (6) on mounting surface (32) of seating plate (3). The pair of auxiliary terminals (6) are provided respectively at both sides with respect to each of a pair of terminal storage grooves (34).

According to this aspect, the pair of auxiliary terminals (6) on both sides of each of the pair of terminal storage grooves (34) is solder-bonded to land (101) of substrate (100), and thus, the joint strength can be increased.

In the fourth aspect, in electrolytic capacitor (1) of a fifth aspect, the pair of auxiliary terminals (6) provided respectively at both the sides with respect to each of the pair of terminal storage grooves (34) are separated from each other.

According to this aspect, since the pair of auxiliary terminals (6) at both sides of each of the pair of terminal storage grooves (34) are separated from each other, the number of portions to be bent can be reduced as compared with a case where there is a portion connecting the pair of auxiliary terminals (6). Thus, since the warpage caused in seating plate (3) due to the stress remaining in the bent portion can be reduced, the lifting of auxiliary mounting portion (60) can be suppressed, and the decrease in the joint strength in the state of being mounted on substrate (100) can be suppressed.

In any one of the first to fifth aspects, in electrolytic capacitor (1) of a sixth aspect, auxiliary mounting portion (60) has second end (60B) at a side farther from adjacent through-hole (33) among the pair of through-holes (33). Second end (60B) is located to reach an end face of seating plate (3) in a direction along the first axis.

According to this aspect, since second end (60B) of auxiliary mounting portion (60) reaches the end face of seating plate (3), there is an advantage that an area of auxiliary mounting portion (60) joined to substrate (100) by solder can be increased and the joint strength is improved.

In any one of the first to sixth aspects, in electrolytic capacitor (1) of a seventh aspect, auxiliary terminals (6) further includes third embedded portion (63) protruding from first end (60A) of auxiliary mounting portion (60), which is being at a side closer to adjacent through-hole (33) of the pair of through-holes (33) in the first axis. Third embedded portion (63) is embedded in seating plate (3).

According to this aspect, since third embedded portion (63) is also embedded in seating plate (3), auxiliary terminal (6) can be hardly detached from seating plate (3).

In the seventh aspect, in electrolytic capacitor (1) of an eighth aspect, third embedded portion (63) is not exposed from terminal storage groove (34).

According to this aspect, it is possible to reduce a possibility that distal end portion (23) of lead terminal (22) inserted into terminal storage groove (34) interferes with third embedded portion (63).

In any one of the first to eighth aspects, in electrolytic capacitor (1) of a ninth aspect, on mounting surface (32) of seating plate (3), auxiliary terminal (6) is disposed away from terminal storage groove (34) by ¾ or more of a width of auxiliary mounting portion (60).

According to this aspect, a sufficient amount of solder fillets are easily formed in distal end portion (23) of lead terminal (22) stored in terminal storage groove (34) and auxiliary mounting portion (60), and the joint strength between electrolytic capacitor (1) and substrate (100) can be increased.

In any one of the first to ninth aspects, in electrolytic capacitor (1) of a tenth aspect, seating plate (3) further includes columnar portion (36), which supports capacitor body (2), on attachment surface (31).

According to this aspect, columnar portion (36) supports capacitor body (2), and thus, there is an advantage that electrolytic capacitor (1) is hardly detached from substrate (100) by vibration.

Seating plate (3) of an eleventh aspect is included in electrolytic capacitor (1). Electrolytic capacitor (1) includes capacitor body (2) that includes a capacitor element, container (21) housing the capacitor element, and a pair of lead terminals (22) protruding from a bottom surface of container (21). Container (21) has a bottomed cylindrical shape. Capacitor body (2) is attached to attachment surface (31) of seating plate (3). Seating plate (3) has a pair of through-holes (33) into which the pair of lead terminals (22) are inserted, respectively. A pair of terminal storage grooves (34) are provided on mounting surface (32) of seating plate (3) opposite to attachment surface (31). Distal end portions

(23) of the pair of lead terminals (22) that inserted into the pair of through-holes (33), respectively, to be bent along mounting surface (32) are inserted into the pair of terminal storage grooves (34), respectively. Seating plate (3) includes auxiliary terminal (6) disposed along each of the pair of terminal storage grooves (34) on mounting surface (32) of seating plate (3). Auxiliary terminal (6) includes auxiliary mounting portion (60), first embedded portion (61), and second embedded portion (62). Auxiliary mounting portion (60) is disposed along a first axis along which adjacent terminal storage groove (34) among the pair of terminal storage grooves (34). First embedded portion (61) and second embedded portion (62) protruding respectively from both sides of auxiliary mounting portion (60) along a second axis intersecting the first axis. First embedded portion (61) and second embedded portion (62) are embedded in seating plate (3), and auxiliary mounting portion (60) is exposed on mounting surface (32) of seating plate (3). On mounting surface (32) of seating plate (3), auxiliary terminal (6) is disposed away from adjacent terminal storage groove (34) among the pair of terminal storage grooves (34) by ⅕ or more of a width of adjacent terminal storage groove (34).

According to this aspect, since the warpage caused in seating plate (3) can be reduced, the lifting of auxiliary mounting portion (60) can be suppressed, and the decrease in the joint strength when the auxiliary mounting portion is mounted on substrate (100) can be suppressed.

The configurations according to the second to ninth aspects are not essential configurations for solid electrolytic capacitor (1), but may be omitted as appropriate.

REFERENCE MARKS IN THE DRAWINGS 1 electrolytic capacitor
2 capacitor body
3 seating plate
6 auxiliary terminal
21 container
22 lead terminal
23 distal end portion
31 attachment surface
32 mounting surface
33 through-hole
34 terminal storage groove
36 columnar portion
60 auxiliary mounting portion
60A first end
60B second end
61 first embedded portion
62 second embedded portion
63 third embedded portion

The invention claimed is:

1. An electrolytic capacitor comprising:
a capacitor body that includes a capacitor element, a container housing the capacitor element, and a pair of lead terminals protruding from a bottom surface of the container, the container having a bottomed cylindrical shape; and
a seating plate that has an attachment surface to which the capacitor body is attached,
wherein:
the seating plate has a pair of through-holes into which the pair of lead terminals are inserted, respectively,
the seating plate has a mounting surface opposite to the attachment surface, the mounting surface having a pair of terminal storage grooves into which distal end portions of the pair of lead terminals are inserted, respectively, the pair of lead terminals being inserted into the pair of through-holes, respectively, to be bent along the mounting surface,
the seating plate includes an auxiliary terminal disposed along each of the pair of terminal storage grooves on the mounting surface of the seating plate,
the auxiliary terminal includes an auxiliary mounting portion, a first embedded portion, and a second embedded portion, the auxiliary mounting portion being disposed along a first axis along which an adjacent terminal storage groove among the pair of terminal storage grooves, the first embedded portion and the second embedded portion protruding respectively from both sides of the auxiliary mounting portion along a second axis intersecting the first axis,
the first embedded portion and the second embedded portion are embedded in the seating plate, and the auxiliary mounting portion is exposed on the mounting surface of the seating plate, and
on the mounting surface of the seating plate, the auxiliary terminal is disposed away from the adjacent terminal storage groove among the pair of terminal storage grooves by ⅕ or more of a width of the adjacent terminal storage groove.

2. The electrolytic capacitor according to claim 1, wherein the auxiliary mounting portion has a first end at a side closer to an adjacent through-hole among the pair of through-holes, the first end being located closer to an outer edge of the seating plate than the adjacent through-hole in a direction along the first axis.

3. The electrolytic capacitor according to claim 1, wherein a section of each of the pair of terminal storage grooves has a sectional shape in which a width at an opening side is wider than a width at a bottom side.

4. The electrolytic capacitor according to claim 1, wherein, the seating plate includes a pair of auxiliary terminals including the auxiliary terminal on the mounting surface of the seating plate, the pair of auxiliary terminals being provided respectively at both sides with respect to each of the pair of terminal storage grooves.

5. The electrolytic capacitor according to claim 4, wherein the pair of auxiliary terminals provided respectively at both sides with respect to each of the pair of terminal storage grooves are separated from each other.

6. The electrolytic capacitor according to claim 1, wherein the auxiliary mounting portion has a second end at a side farther from an adjacent through-hole among the pair of through-holes, the second end being located to reach an end face of the seating plate in a direction along the first axis.

7. The electrolytic capacitor according to claim 1, wherein:
the auxiliary terminal further includes a third embedded portion protruding from a first end of the auxiliary mounting portion, the first end being at a side closer to an adjacent through-hole among the pair of through-holes in the first axis, and
the third embedded portion is embedded in the seating plate.

8. The electrolytic capacitor according to claim 7, wherein the third embedded portion is not exposed on the terminal storage groove.

9. The electrolytic capacitor according to claim 1, wherein, on the mounting surface of the seating plate, the auxiliary terminal is disposed away from the terminal storage groove by ¾ or more of a width of the auxiliary mounting portion.

10. The electrolytic capacitor according to claim 1, wherein the seating plate further includes a columnar portion on the attachment surface, the columnar portion supporting the capacitor body.

11. A seating plate provided in an electrolytic capacitor, wherein:
- the electrolytic capacitor includes a capacitor body that includes a capacitor element, a container housing the capacitor element, and a pair of lead terminals protruding from a bottom surface of the container, the container having a bottomed cylindrical shape,
- the capacitor body is attached to an attachment surface of the seating plate,
- the seating plate has a pair of through-holes into which the pair of lead terminals are inserted, respectively,
- the seating plate has a mounting surface opposite to the attachment surface, the mounting surface having a pair of terminal storage grooves into which distal end portions of the pair of lead terminals are inserted, respectively, the pair of lead terminals being inserted into the pair of through-holes, respectively, to be bent along the mounting surface,
- the seating plate includes an auxiliary terminal disposed along each of the pair of terminal storage grooves on the mounting surface of the seating plate,
- the auxiliary terminal includes an auxiliary mounting portion, a first embedded portion, and a second embedded portion, the auxiliary mounting portion being disposed along a first axis along which an adjacent terminal storage groove among the pair of terminal storage grooves, the first embedded portion and the second embedded portion protruding respectively from both sides of the auxiliary mounting portion along a second axis intersecting the first axis,
- the first embedded portion and the second embedded portion are embedded in the seating plate, and the auxiliary mounting portion is exposed on the mounting surface of the seating plate, and
- on the mounting surface of the seating plate, the auxiliary terminal is disposed away from the adjacent terminal storage groove among the pair of terminal storage grooves by $1/5$ or more of a width of the adjacent terminal storage groove.

* * * * *